United States Patent [19]
Jain

[11] Patent Number: 5,193,151
[45] Date of Patent: Mar. 9, 1993

[54] DELAY-BASED CONGESTION AVOIDANCE IN COMPUTER NETWORKS

[75] Inventor: Rajendra K. Jain, Sudbury, Mass.

[73] Assignee: Digital Equipment Corporation, Maynard, Mass.

[21] Appl. No.: 400,858

[22] Filed: Aug. 30, 1989

[51] Int. Cl.⁵ .............................. G06F 13/00
[52] U.S. Cl. ...................... 395/200; 370/60; 370/94.1; 364/DIG. 1; 364/284; 364/284.3
[58] Field of Search .............. 370/94.1, 60; 364/200 MS File, 900 MS File

[56] References Cited

U.S. PATENT DOCUMENTS

| | | | |
|---|---|---|---|
| 4,404,557 | 9/1983 | Grow | 340/825.05 |
| 4,475,192 | 10/1984 | Fernow et al. | 370/94 |
| 4,551,833 | 11/1985 | Turner | 370/60 |
| 4,569,042 | 2/1986 | Larson | 370/13 |
| 4,617,657 | 10/1986 | Drynan et al. | 370/60 |
| 4,736,369 | 4/1988 | Barzilai et al. | 370/94.1 |
| 4,769,815 | 9/1988 | Hinch et al. | 370/94 |
| 4,771,391 | 9/1988 | Blasbalg | 364/514 |
| 4,779,267 | 10/1988 | Limb | 370/94 |
| 4,962,498 | 10/1990 | May, Jr. | 370/94.1 |
| 5,042,029 | 8/1991 | Hayakawa | 370/60 |

OTHER PUBLICATIONS

Flow control in the packet switching networks, Communication Networks, Uxbridge, England: On line, pp. 349-361, 1975.
"A Time-Out-Based Congestion Control Scheme for Window Flow-Controlled Networks", Raj Jain, IEEE Journal on SAC, Oct. 1986, pp. 1162-1167.
"Congestion Avoidance in Computer Networks With A Connectionless Network Layer", Raj Jain et al., Report DEC-TR-506, 1988.
"A Delay-Based Approach for Congestion Avoidance in Interconnected Heterogeneous Computer Networks", Raj Jain, Report DEC-TR-566, 1988.

Primary Examiner—Gareth D. Shaw
Assistant Examiner—Kakali Chaki
Attorney, Agent, or Firm—Arnold, White & Durkee

[57] ABSTRACT

A packet data communication system employs a congestion avoidance method in which each node measures the round-trip delay occurring when it sends data to a destination and receives an acknowledgement. This delay is measured for different load levels, and a comparison of these delays is used to determine whether to increase or decrease the load level. The load level can be adjusted by adjusting the window size (number of packets sent in to the network) or by adjusting the packet rate (packets per unit time). The objective is operation at the knee in the throughput vs. traffic curve, so that the data throughput is high and the round trip delay is low. Control is accomplished at each node individually, without intervention by the router or server, so system overhead is not increased.

27 Claims, 5 Drawing Sheets

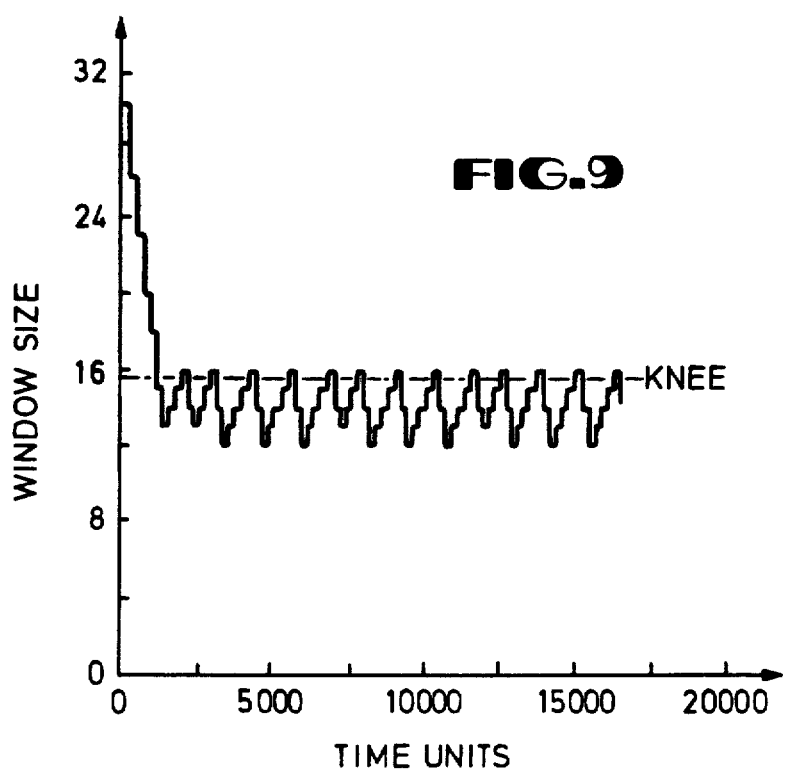
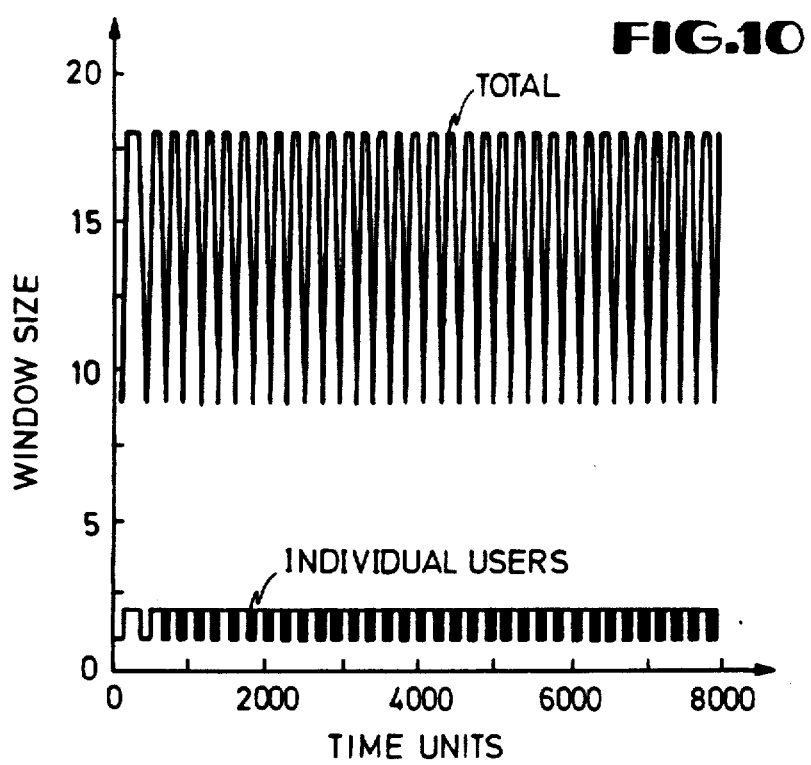

DELAY-BASED CONGESTION AVOIDANCE IN COMPUTER NETWORKS

BACKGROUND OF THE INVENTION

This invention relates to data communication systems, and more particularly to a delay-based procedure for congestion avoidance in a packet data communication network employing serial data transmission.

Traditional congestion control schemes act to reduce the load on the network when the load on the network becomes excessive and packets start getting lost. They allow the network to recover from congestion. Congestion avoidance mechanisms, on the other hand, are prevention mechanisms which allow the network to operate at the optimum load.

In copending application entitled "Congestion Avoidance in Computer Networks," Ser. No. 184,945, filed Apr. 22, 1988, by Rajendra K. Jain, K. K. Ramakrishnan and Dah-Ming Chiu, assigned to Digital Equipment Corporation, assignee of this invention, there is disclosed a congestion avoidance scheme for computer networks in which each router in a network seeks to constrain the total traffic it handles, i.e., its load, to assure that the load is within a region of optimum performance for that router. To accomplish this control, the router generates feedback to the nodes by means of bits in the packets being received by those nodes, to indicate the overload condition. While this system is effective in the function of congestion avoidance, nevertheless the requirement that certain feedback bits be added to the packet is not consistent with use of the system in networks where the packet format is fixed and new bits cannot be added. Also, in a heterogeneous network containing nodes and servers of diverse types, the bits may be meaningless to some equipment. In addition, the method adds overhead to the router or server function.

Other computer network architectures have schemes for congestion control. For example, the Digital Network Architecture (DNA) uses a timeout-based congestion control as disclosed in IEEE Journal on Selected Areas in Communications, October 1986, pp. 1162-1167, and square root buffer limiting as disclosed in IEEE Trans. on Communications, March 1978, pp. 328-337. IBM's System Networking Architecture (SNA) uses congestion bits called a "change window indicator" (CWI) and a "reset window indicator" (RWI) in packets flowing in the reverse direction to ask source nodes to reduce the load during congestion, as disclosed in IBM Systems Journal, Vol. 18, No. 2, 1979, pp. 298-314. In general, other congestion schemes consist of a feedback signal from the network to the users (in the form of timeout, bits, or messages) and a load-control mechanism exercised by the users (reduced window rate).

These prior schemes are all congestion control schemes. Also, they have been dedicated to a specific network system design and protocol, and are not applicable to other types of network architectures. In a network consisting of heterogeneous subnetworks, the congestion feedback from one subnetwork usually would have no meaning to sources on other subnetworks.

It is the principal object of this invention to provide a congestion avoidance procedure for computer networks which is operable in heterogeneous networks, i.e., networks in which subnetworks of differing architecture, e.g., SNA, TCP/IP, ISO/OSI, DNA, etc., may be present. Another object is to provide a congestion avoidance scheme which does not add overhead to the network itself, i.e., to the packet-forwarding routers or servers, and one which does not add overhead to the packet in the form of additional bits for feedback. A further object is to provide a congestion avoidance scheme which does not itself inject additional packets into the network, thereby adding to the traffic load. An additional object is to provide a congestion avoidance scheme which is able to adapt to changing network configurations and traffic, adapting dynamically to a moving target of optimum loading.

SUMMARY OF THE INVENTION

In accordance with one embodiment of the invention, a packet data communication system employs a congestion avoidance method in which each node measures the round-trip delay occurring when it sends data to a destination and receives an acknowledgement. This delay is measured for different load levels, and a comparison of these delays is used to determine whether to increase or decrease the load level. The load level can be changed by adjusting a network tuning parameter such as the window size (number of packets sent in to the network) or the packet rate (packets per unit time). The objective is operation at the knee in the throughput vs. traffic curve, so that the data throughput is high and the round trip delay is low. Control is accomplished at each node individually, without intervention by the router or server, so system overhead is not increased.

BRIEF DESCRIPTION OF THE DRAWINGS

The novel features believed characteristic of the invention are set forth in the appended claims. The invention itself, however, as well as other features and advantages thereof, will best be understood by reference to a detailed description of a specific embodiment which follows, when read in conjunction with the accompanying drawings, wherein:

FIGS. 7-10 are graphic representations of window size vs. time similar to FIGS. 5 and 6, for a node employing the procedure of the invention, according to other examples.

DETAILED DESCRIPTION OF SPECIFIC EMBODIMENT

Figure 1:
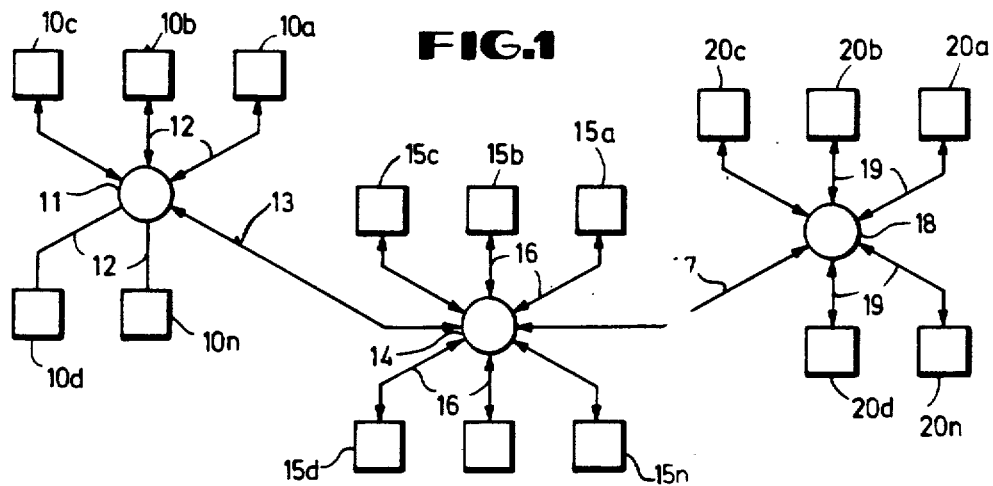
FIG. 1 is an electrical diagram in block form of a data communication system which may use features of the invention.

Referring to FIG. 1, a packet-type data communication system for transmitting and receiving data packets is illustrated according to one embodiment which may implement features of the invention. A number of users or nodes 10a-10n are connected to a router or server 11 by links 12. The links 12 may be point-to-point communication links or a shared communication medium such as a token ring or Ethernet LAN. Each one of the nodes 10a-10n is a CPU or similar processor-type device which is capable of generating and receiving message packets. The nodes 10 could be disk controllers, high speed printer facilities, or other resources of this type, as well as high-performance data processors. The router 11 is coupled by a link 13 to a router or server 14, to which a number of nodes 15a-15n are connected by links 16. Similarly, the router 14 is coupled by a link 17 to a router 18 which is connected by links 19 to a number of nodes 20a-20n. There may be many more of such routers in the complete network. Each of the routers 11, 14 and 18 may have up to perhaps many dozens of nodes coupled to it, and there may be many of the routers, so the network may contain thousands of nodes. The links 13 and 17 may include wire links in the same building or between buildings, or may include long-distance fibre optic links, as well as satellite links.

The network may consist of several subnetworks each of which may follow a different protocol. For example, the three routers shown in FIG. 1 may be parts of three different subnetworks following DNA, SNA, and TCP/IP, protocols, respectively.

One of the nodes in the system of FIG. 1 would often have rather large blocks of data to send to another node, perhaps several megabytes, but using the packets of typical format this data must be split into many packets of perhaps 512-bytes each. Instead of sending hundreds or thousands of the packets in one burst, however, a node must follow the priority and fairness criteria established for the network.

The routers contain buffers to receive packets from a node and hold them for forwarding towards the destination when a path is free. These buffers act as first-in-first-out memories. When the buffers are full, however, an incoming packet is merely discarded, and the sender will have to resend it. Buffers also exist at the receiving node (destination).

According to one method of flow control, depending upon the availability of buffers, the destination node allows the source node to send a number of packets, called a window; if this window exceeds the store-and-forward capacity of these buffers in the routers, then a source would send packets needlessly when they were being discarded. Buffer overflow may occur in routers even if it does not occur in the destination.

Another alternative for limiting the load on the network is via packet rates. In this method, the destination permits the source to send packets at a rate of a certain number of packets per unit of time. In this "rate-based" scheme, if the rate permitted by the destination exceeds the capacity of the intermediate routers, too many packets may queue up at the router and eventually the buffers may become full, leading to packet loss.

The limiting rate in a rate-based scheme, can also be specified in terms of bits per second or bytes per second instead of packets per unit of time.

In addition to the window size or packet rate parameters, a network protocol generally has other parameters, referred to as network tuning parameters, which may be adjusted to optimize network performance. Generally, these tuning parameters also affect network loading.

Figure 2A:
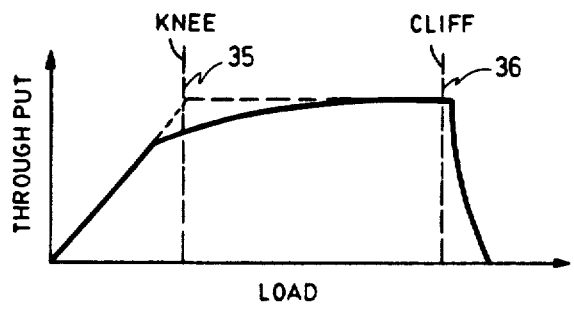
FIGS. 2a-2c are graphic representations of throughput, time delay and power as a function of load (number of packets sent) in a network such as that of FIG. 1.
Figure 2B:
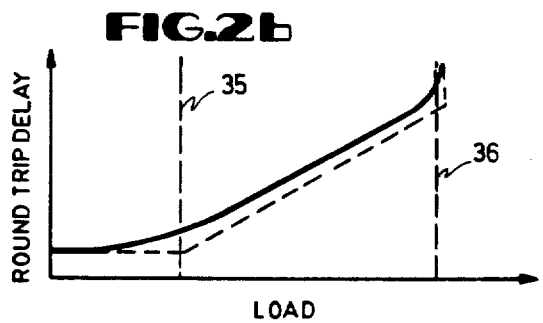
Figure 2C:
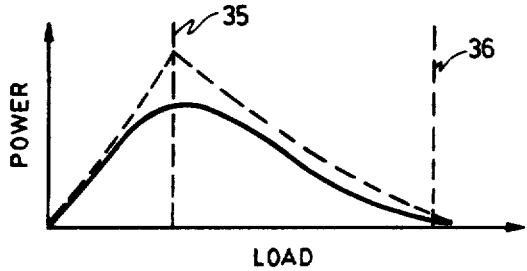

Referring to FIGS. 2a-2c, the performance of a network as seen in FIG. 1 is illustrated as a function of the load, where the load is a measure of the number of packets per unit of time entered by the nodes to the network. In FIG. 2a, it is seen that the throughput (total number of packets sent by any node and received by the destination node) increases linearly with load when the load is low, then when load level 35 is reached a "knee" of the curve occurs, after which an increased load does not increase the throughput significantly but instead additional messages sent will result in unnecessary queueing and increased delay. In FIG. 2b, the delay per packet is plotted as a function of load; below the knee 35 the delay is essentially constant, but above the knee the delay increases with increasing load. At a load level 36, referred to as the "cliff", the capacity of the network is reached, in that additional packets sent by source nodes will not result in any packets getting through, so the throughput approaches zero and the delay approaches infinity, as seen in FIGS. 2a and 2b. It is desirable that a network operate at the knee 35, rather than at the cliff 36. Congestion control schemes attempt to keep the network load to the left of the cliff while congestion avoidance schemes try to maintain the load at the optimum knee level 35. There are several ways to define the knee. One definition is in terms of "network" which is defined as the ratio of network throughput to the round trip delay. Sometimes an exponent $\alpha$ is used and the power is defined as follows:

$$\text{Power} = \frac{(\text{Throughput})^\alpha}{\text{Delay}}$$

The knee is defined as the load at which the power is maximum as shown in FIG. 2c. By choosing the parameter $\alpha$ greater than one, the network designers can choose to operate the network at a relatively higher delay. Similarly, by choosing $\alpha$ less than one, the designers can choose to operate at a relatively higher throughput.

An analysis of a method of calculating the optimum window size for operating at the knee will be first made using the assumption that there are no other nodes on the network sending packets, so the only source of delay or limitation in throughput is the capacity of the routers to handle traffic, i.e., how long a queue can be built up before reaching the knee. The following analysis uses these symbols:

W = Window = Number of packets in the network
T = Throughput in packets per unit of time
D = Round-trip delay
P = Power = $T^\alpha/D$
$\alpha$ = Exponent used in defining Power The round-trip delay D and the throughput T are both functions of the window W:

$$D = f_D(W)$$

$$T = f_T(W)$$

The power is defined as the ratio of throughput and delay:

$$P = \frac{T^\alpha}{D}$$

Here, $\alpha$ is a parameter chosen by the network designers. From the definition of P, the following can be expressed:

$$\log(P) = \alpha \log(T) - \log(D)$$

At the point of maximum power, i.e., at the knee:

$$\frac{dP}{P} = \alpha \frac{dT}{T} - \frac{dD}{D} = 0$$

or $$\alpha \frac{dT}{T} = \frac{dD}{D}$$

Thus, at the knee, the relative (percentage) increase in delay is $\alpha$ times the relative increase in throughput. If $\alpha = 1$, the percentage increase in delay is equal to the percentage increase in throughput at the knee. Before the knee:

$$\frac{dD}{D} < \frac{dT}{T}$$

the relative increase in delay is smaller than the relative gain in throughput. After the knee:

$$\frac{dD}{D} > \frac{dT}{T}$$

the relative increase in delay is smaller than the relative gain in throughput.

To obtain a higher relative increase in delay at the knee, then the system provides $\alpha > 1$. Similarly, a system with $\alpha > 1$ provides higher relative increase in throughput at the knee.

For a window flow controlled network, at a given node the throughput T is W packets per round-trip delay, or $$T = \frac{W}{D}$$

and therefore, $$\log(P) = \alpha \log(W) - (1 + \alpha) \log(D)$$

At the knee (i.e., where $dP = 0$):

$$\frac{dP}{P} = \alpha \frac{dW}{W} - (1 + \alpha) \frac{dD}{D} = 0$$

By solving the above condition for W, we get the optimal window size $\hat{W}$ as:

$$\hat{W} = \frac{\alpha}{1 + \alpha} \left( \frac{D}{\frac{dD}{dW}} \right)$$

The above equality holds exactly only if the derivative $dD/dW$ and the delay D are measured at $W = \hat{W}$. At other values of W, the equation can be used to find the relative value of $\hat{W}$ with respect to W, that is, to find if $\hat{W}$ is less (or more) than W.

The analysis so far is valid for all networks or resources since no assumptions are made about the behavior of the internal components of the network, deterministic or probabilistic distributions of service times, or linear or nonlinear behavior of the delay versus window curve.

If there are no other users on the network, the above analysis provides a way for one node (one user) to determine the knee using the measured delay D and the gradient $dD/dW$ of the delay-window curve.

The value of $\hat{W}$ as calculated using the above equation gives the optimal direction for window adjustment. If the current window is less than $\hat{W}$, then the window should be increased. Similarly, if the current window W is less than $\hat{W}$, the window size should be decreased. The exact difference between W and W may or may not be meaningful; for example, if the gradient $dD/dW$ is zero at a particular W, then $\hat{W}$ is infinite indicating that W should be increased, but this should not be interpreted to mean that the path has infinite knee capacity. At different values of window W, the calculated $\hat{W}$ may be different, but in each case it points in the right direction. In other words, only the sign, and not the magnitude, of the difference ($\hat{W} - W$), is meaningful.

One way to determine the correct direction of window adjustment is to use the normalized delay gradient (NDG) which is defined as the ratio:

$$\text{Normalized delay gradient} = \frac{dD/dW}{D/W}$$

If the load is low, NDG is low, or, if the load is high, NDG is high. At the knee, NDG is given by:

$$\frac{dD/dW}{D/W} = \frac{\alpha}{1 + \alpha}$$

If the parameter $\alpha = 1$, the NDG at knee is one-half. Thus, by calculating NDG, the decision of whether to increase or decrease the window size is apparent.

For multiuser systems, the above equation for $\hat{W}$ is no longer straightforward. There are two optimal operating points, one being "social" and the other being "selfish".

Given n users (nodes) sharing a single path, the system throughput T is a function of the sum of the windows of all n users:

$$T = \frac{\sum_{i=1}^{n} W_i}{D}$$

Here, $W_i$ is the window of the $i^{th}$ user, and D is the common delay experienced by each of the n users. The system power is defined on the basis of system throughput:

$$P = \frac{T^\alpha}{D} = \frac{\left( \sum_{i=1}^{n} W_i \right)^\alpha}{D^{1+\alpha}} = D^{-1-\alpha} \left( \sum_{i=1}^{n} W_i \right)^\alpha$$

The point of maximum system power is given by a set of n equations like the following:

$$\frac{\partial P}{\partial W_i} = -(1+\alpha)D^{-2-\alpha}\frac{\partial D}{\partial W_i}\left(\sum_{i=1}^{n} W_i\right)^{\alpha} +$$

$$D^{-1-\alpha}\alpha\left(\sum_{i=1}^{n} W_i\right)^{\alpha-1} = 0 \text{ or,}$$

$$\sum_{i=1}^{n} W_i = \frac{\alpha}{1+\alpha}\left(\frac{D}{\frac{\partial D}{\partial W_i}}\right) \text{or,}$$

$$\hat{W}_i = \frac{\alpha}{1+\alpha}\left(\frac{D}{\frac{\partial D}{\partial W_i}}\right) - \sum_{j \ne i}^{n} \hat{W}_j$$

The optimal operating point so obtained is called the social optimum. Note that the delay D and the partial derivatives $\partial D/\partial W_i$ in the above equation should be evaluated at $W_i = \hat{W}_i$.

Each individual user's power $P_i$ is based on the user's throughput $T_i$ and is given by $$T_i = \frac{W_i}{D} \text{ and}$$

$$P_i = \frac{T_i^\alpha}{D} = \frac{W_i^\alpha}{D^{1+\alpha}} = D^{-1-\alpha} W_i^\alpha$$

The user's power is maximum when:

$$\frac{\partial P_i}{\partial W_i} =$$

$$-(1+\alpha)D^{-2-\alpha}\frac{\partial D}{\partial W_i} W_i^\alpha + D^{-1-\alpha}\alpha W_i^{\alpha-1} = 0 \text{ or,}$$

$$\hat{W}_i = \frac{\alpha}{1+\alpha}\left(\frac{D}{\frac{\partial D}{\partial W_i}}\right)$$

The operating point so obtained is called a selfish optimum. It is clear by examining the above equations for $\hat{W}_i$ that $\hat{W}_i$ obtained by the selfish optimum is not the same as that obtained by the social optimum. They may not indicate that the node should change its window size in the same direction. The two values are equal if $\Sigma_{j \ne i} W_j = 0$, that is, if there is only one user on the network; for such a case, either equation for $\hat{W}_i$ can be used to determine the direction of window adjustment.

Social considerations would lead a conscientious user to lower the window size as other users increase their traffic, while selfish considerations would lead a user to increase its window size as other users increase their traffic. This behavior is not only mathematically true according to the above relationships for $\hat{W}_i$, but it is also intuitively true; it is observed that persons start hoarding a resource and increase their apparent demand for it if the resource begins to exhibit a condition of short supply. In congestion avoidance, the aim is attaining social optimum, because selfish optimum leads to a race condition in which each user tries to maximize its power at the cost of that of the others, and the windows keep increasing without bound.

An examination of the equation above for $W_i$ for social optimum shows that at a given node it is necessary to know the windows of all the other users in order to determine the social optimum window at this node. A congestion avoidance method requiring each node to send a packet to all of the other nodes to inform the other users of the window size being used would cause too much overhead in added traffic to be acceptable. Fortunately, there is a special case in which knowledge of other users' windows is not required to achieve the social optimum. This special case involves deterministic networks.

A deterministic computer network is one in which the packet service time (the time to forward a packet) at the servers or routers is not a random variable. The service time per packet at different servers may be different, but at each server the time is fixed. Analytically, such networks can be modeled by a closed queueing network of m D/D/1 servers, where m is the number of queues that the packets and their acknowledgements pass through in one round trip through the network. For such networks the delay versus window curve consists of two straight line segments meeting at the knee. Before the knee, the delay is constant:

$$D(W) = \sum_{i=1}^{m} t_i$$

where, $t_i$ is the service time of the $i^{th}$ server. After the knee, the delay increases linearly:

$$D(W) = Wt_b$$

where $t_b$ is the service time of the bottleneck server, i.e., $$t_b = \max_i \{t_i\}$$

Fixed delay servers such as satellite links are not included in the maximum determination but are included in the summation. The two equations for delay above can be combined into one:

$$D(W) = \max\left\{\sum_{i=1}^{m} t_i, Wt_b\right\}$$

The power is maximum at the knee, where:

$$\sum_{i=1}^{m} t_i = Wt_b$$

or, $$W_{knee} = \frac{\sum_{i=1}^{m} t_i}{t_b}$$

This equation for optimal window size allows calculation of the knee capacity of the path $$\text{Knee capacity of a path} \simeq \frac{\text{Sum of all service times}}{\text{Bottleneck service time}}$$

The congestion avoidance procedure executed at a node need to answer the following three questions: (1) Whether to increase or decrease the size of the window? This is the "decision function". (2) How large a change in window size should be made? This is the "increase/decrease" algorithm. (3) How often should a change be made in the window size? This is referred to as "decision frequency". These three components together form what is called user policy. The delay-based procedure according to the invention has no network policy since the network does not explicitly participate in the congestion avoidance method as will be described, although other congestion avoidance methods such as that of above-referenced copending application may be used at the same time.

The decision function of the procedure determines the direction of window adjustment at a node. The normalized delay gradient NDG can be used as the decision function. For deterministic networks, NDG is zero to the left of the knee. Given round-trip delays D and $D_{old}$ at windows W and $W_{old}$ respectively, the decision function consists of checking simply if NDG is zero. This algorithm is described below:

$$NDG \leftarrow \left(\frac{D - D_{old}}{D + D_{old}}\right)\left(\frac{W + W_{old}}{W - W_{old}}\right);$$

IF $(NDG > \delta$ or $W = W_{max})$
THEN Decrease($W$)
ELSE IF $(NDG \leq \delta$ or $W = W_{min})$
THEN Increase($W$);

In the above algorithm, $\delta$ is the threshold value chosen by the network designers. The threshold value of $\alpha/(1+\alpha)$, $\frac{1}{2}$, zero, etc. may be used depending upon the desired operating point. $W_{min}$ and $W_{max}$ are the lower and upper bounds on the window. The upper bound is set equal to the flow control window permitted by the receiving node based on its local buffer availability considerations. The lower bound is greater or equal to one since the window cannot be reduced to zero.

$$W_{min} \geq 1$$

$$W_{max} \geq W_{min}$$

By setting $W_{min} = W_{max}$, the window adjustment can be disabled. Note the window must either increase or decrease at every decision point. It cannot remain constant (except when the procedure has been disabled by setting $W_{min} = W_{max}$). This is necessary since the network load is constantly changing, and it is important to ensure that changes in gradient, if any, are detected as soon as possible. Also note that instead of checking whether the change in delay $(D - D_{old})$ is zero, the comparison is whether NDG is zero. These two conditions may be equivalent but the latter is preferred since NDG is a dimensionless quantity and its value remains the same regardless of whether delays are measured in nanoseconds, milliseconds, seconds, or any other time units. The difference in delay could be made to look arbitrarily small (or large) by appropriate manipulation of its units, but NDG is not susceptible to such manipulations.

The procedure uses additive increase and multiplicative decrease algorithms which are the simplest alternatives leading to fairness and convergence for multiple users starting at arbitrary window values. Thus, if the window has to be increased, we do so additively:

$$W \leftarrow W + \Delta W$$

For a decrease, window is multiplied by a factor less than one:

$$W \leftarrow cW, c < 1$$

The parameters $\Delta W$ and c affect the amplitude and frequency of oscillations when the system operating point approaches the knee. Recommended values of these two parameters are $\Delta W = 1$ and $c = 0.875$.

The choice of additive increase and multiplicative decrease is for the following reasons. If the network is operating below the knee, all users increase their window size equally, but, if the network is congested, the multiplicative decrease makes users with larger windows reduce more than those with smaller windows, making the allocation more fair. Note that $0.875 = 1 - 2^{-3}$. Thus, the multiplication can be performed without floating point hardware, and by simple logical shift instructions. The recommended values of the increase/decrease parameters lead to small oscillations and are easy to implement. The computations should be rounded to the nearest integer. Truncation, instead of rounding, results in a slightly lower fairness.

Figure 3:
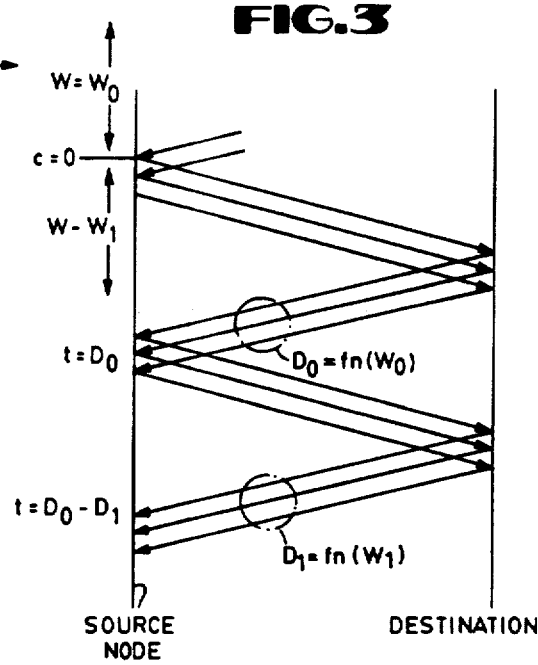
FIG. 3 is a space-time diagram showing events vs. time for packet data transmission and reception in a system of FIG. 1.

The "decision frequency" component of the procedure helps decide how often to change the window size. Changing too often leads to unnecessary oscillations, whereas changing infrequently leads to a system that takes too long to adapt. According to general system control theory, the optimal control frequency depends upon the feedback delay—the time between applying a control (change window size) and getting feedback from the network corresponding to this control. In a computer network such as that of FIG. 1, it takes one round-trip delay to affect the control, that is, for the new window to take effect, and another round-trip delay to get the resulting change fed back from the network to the node which made the change. The operation of the congestion avoidance system is illustrated in FIG. 3, which depicts the flow of data packets and acknowledgements over time. In FIG. 3, prior to time $t = 0$ the window size W is $W_0$ (in the illustration, $W_0 = 2$ packets), and at $t = 0$ the window size is changed to $W_1$ (in the illustration, $W_1 = 3$ packets). Beginning at $t = 0$, three packets are sent, and beginning at $t = D_0$ the acknowledgements for these three packets begin to arrive at the source node. At time $t = D_0 + D_1$ the acknowledgements for the three packets sent beginning at time $t = D_0$ start to arrive.

The delay experienced by a packet is a function of the window size used before the packet is sent. The delay $D_0$ is a function of $W_0$, and the delay $D_1$ is a function of $W_1$. This, therefore, leads to the conclusion that windows be adjusted once every two round-trip delays (two window turns) and that only the feedback signals received in the most recent cycle be used in window adjustment.

In the procedure as outlined above, alternate delay measurements are discarded. This leads to a slight loss of information which can be avoided by a simple modification. The delay experienced by every packet is a function of the number of packets already in the network. This number is normally equal to the current window except at the point of window change. If for those packets whose sending times are recorded for round-trip delay measurements, there is also recorded the number $W_{out}$ of packets outstanding (packets sent but not acknowledged) at the time of sending, the delay D and the number $W_{out}$ have a one-to-one correspondence. Any two $\{W_{out}, D\}$ pairs can thus be used to compute NDG. This modification allows updating the window every round-trip delay. The increased information results in a faster response to the network changes.

With regard to initialization, the procedure does not set any requirements on the window values to be used when a node starts a new connection through the network. Transports can start the connections at any window value and the procedure will eventually bring the load to the knee level. Nonetheless, starting at the minimum window value is recommended as this causes minimal affect on other users that may already be using the network.

A simulation model was used to demonstrate the performance of various delay-based congestion avoidance alternatives. This same model was used earlier for evaluation of a timeout-based congestion control method as described in IEEE Journal on Selected Areas in Communications, October 1986, pp. 1162-1167 and of the binary feedback congestion avoidance method of the above-mentioned copending application which is also described in Proc. ACM Sigcomm '88, Stanford, CA, August 1988. The model allows simulation of a general computer network with several terrestrial and satellite links, with any reasonable number of users, intermediate systems, and links.

Figure 4:
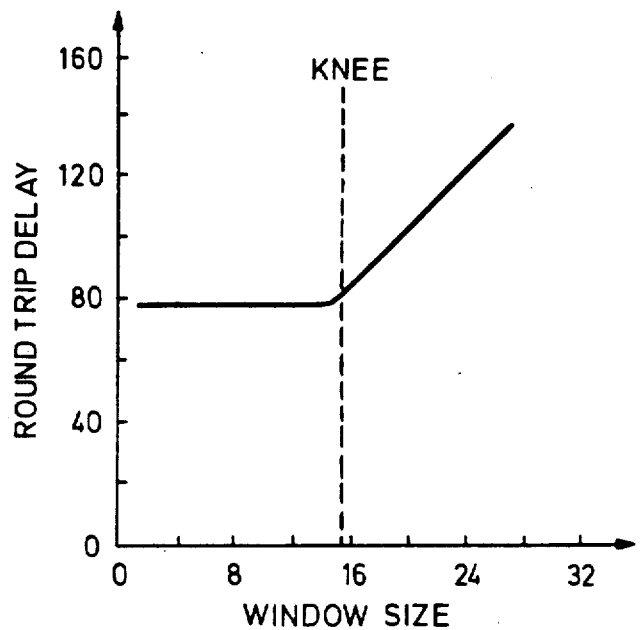
FIG. 4 is a graphic representation of delay vs. window size for a network according to one embodiment.
Figure 5:
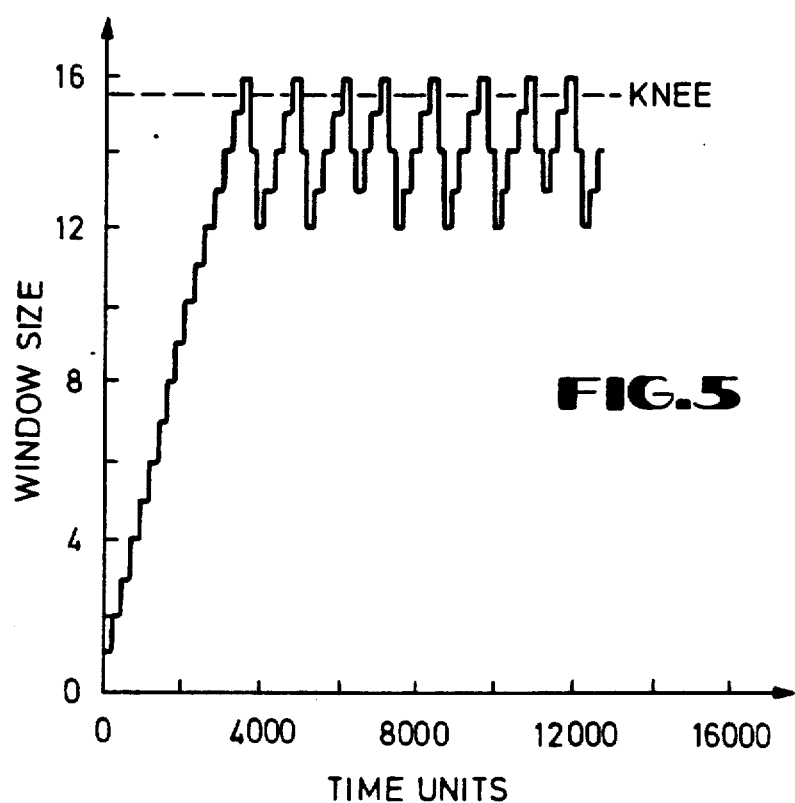
FIG. 5 is a graphic representation of window size vs. time for a node employing the procedure of the invention, according to one embodiment.

Referring to FIGS. 4 and 5, a network configuration was simulated with a satellite link and with several terrestrial links; that is, the network was similar to that of FIG. 1, with one of the links 13, 17, etc., a satellite link and others wire or fibre optics links. Most large networks now in use generally consist of several wide area networks (WANs) and local area networks (LANs) connected together via satellite links, together forming a "very large area network" or VLAN. The queueing model of the simulated network consists of four servers with deterministic service times of 2, 5, 3, and 4 units of time, and the satellite link is represented by a fixed (regardless of window) delay of 62.5 units of time. All service times are relative to source service time which therefore has a service time of 1. For this network, the bottleneck server's service time $t_b5$, and $\Sigma t_i = 77.5$. If the total number of packets in this network is W, the delay D is given by:

$$D = \text{Max}\{7.5, 5W\}$$

The knee of the delay curve as seen in FIG. 4 is at $W_{knee} = 77.5/5 = 15.5$.

A plot of window size as a function of time, as obtained from simulation using the sample procedure, is shown using a solid line curve in FIG. 5, where it is seen that within sixteen window adjustments, the window reaches the optimal value (shown using a broken line curve) and then oscillates between the values of twelve and sixteen. Every fourth cycle, the window curve takes an upturn at thirteen (rather than at twelve) because window values are maintained as real numbers even though the actual number of packets sent is the nearest integer.

Figure 6:
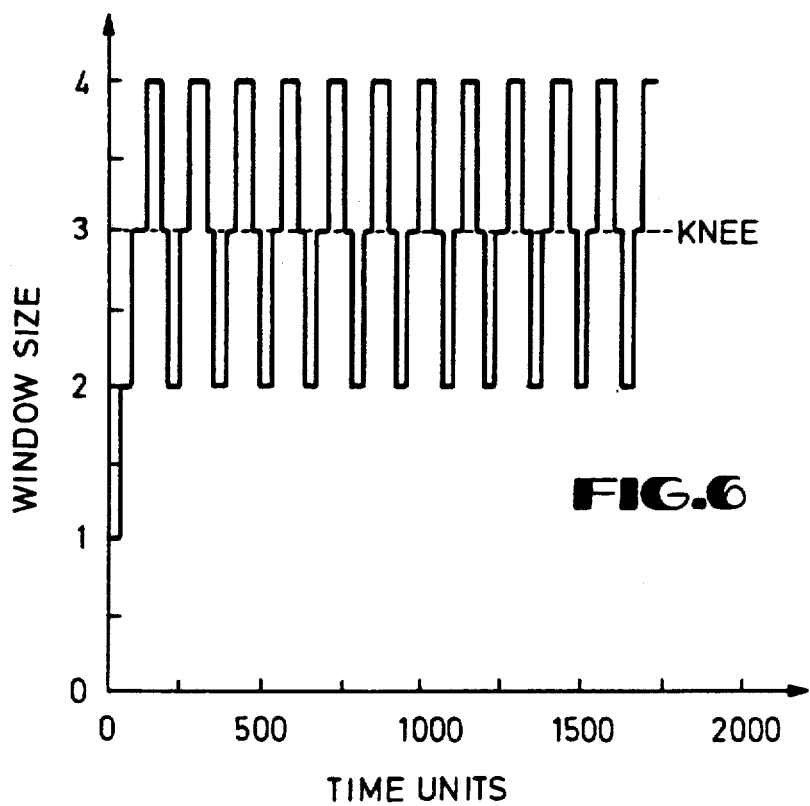
FIG. 6 is a graphic representation of window size vs. time similar to FIG. 5, for a node employing the procedure of the invention, according to another example.

Referring to FIG. 6, another example is illustrated, in this case a terrestrial wide are network. This configuration is similar to the VLAN network except that there is no satellite link. The network is similar to that shown in FIG. 1, i.e., a packet passes through a number of routers 11, 14 and 18 between the source node and the destination node, and the acknowledgement packet likewise passes through these routers or servers. The service times of the four servers are 2, 5, 4, and 3 time units (relative to the source). The delay with W packets circulating in the network is $D = \text{Max}\{15, 5W\}$ and the knee of the delay curve is at $W_{knee} = 3$. FIG. 6 shows the window curve as obtained using this sample procedure, and, once again, it is seen that the window size oscillates closely around the knee.

Figure 7:
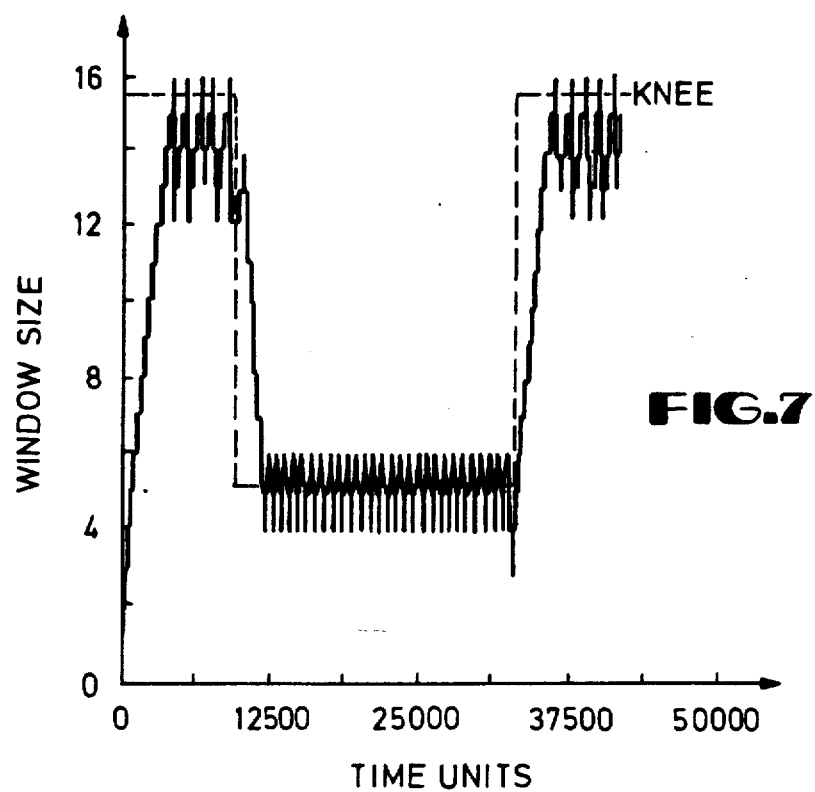

Referring to FIG. 7, it is seen that the procedure responds to changes in link speeds as the configuration of the network changes. Computer networks are constantly being reconfigured as links go down or come up. As a test of whether the congestion avoidance procedure responds to such dynamic conditions, the input packet stream is divided into three parts. During the middle part the bottleneck router speed is changed by a factor of three and the optimal window size changes from 15.5 to 5.17. In the third part of the stream, the bottleneck servers speed changes back to original and once again the window curve goes back up to the optimum of 15.7. In the Figure, the optimum window is shown by the broken line and the window as obtained using the sample procedure is shown by the broken line. It is seen that the procedure closely follows the changes in the optimum.

Figure 8:
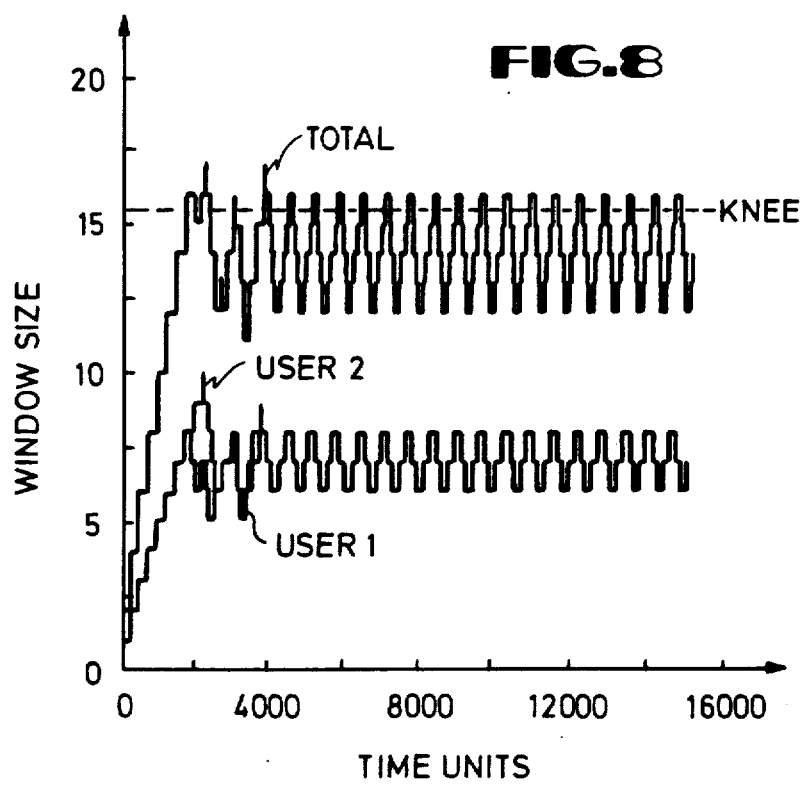

Another measure of the performance is fairness. Referring to FIG. 8, the performance for the VLAN network with two users is illustrated. The optimal window per user in this case is 7.75 and as seen both users have windows that oscillate between six and eight. The total (sum of the two) window oscillates between twelve and sixteen.

Referring to FIG. 9, it is seen that the window size converges to the knee capacity regardless of the starting window. Since the procedure is responsive and adapts to changes in the network configuration, the initial window where a user starts is irrelevant. As shown in FIG. 9, even if starting at a very high window, the user quickly comes down to the knee.

The procedure demonstrates convergence under heavy congestion; referring to FIG. 10, a window curve is shown for a highly congested wide area network (WAN) configuration with nine users. The knee capacity of the path is only three. The optimal window per user calculated using the formula is one-third. Since the minimum window size is one, the users keep oscillating between window size of one and two, and the total window oscillates between nine and eighteen. Many alternative decision functions are unsuitable due to divergence for this configuration; in a diverging case the users try to optimize their local power (rather than simply checking NDG to be zero). The users discover that to optimize their local power they need windows at least as large as the sum of the other users. This leads to a case where the mean window of the users keeps going up without bound.

The procedure described herein, according to the invention, provides a congestion avoidance method, at least for deterministic networks, having a number of advantageous features:

1. Zero network overhead: There is no overhead on intermediate systems such as servers or routers; there is no requirement that intermediate systems measure their loads or queue lengths, so the resources of the intermediate systems (routers, servers, etc.) can be dedicated to packet forwarding rather than feedback to the nodes.

2. No new packets: Unlike a source-quench scheme or choke-packet scheme, this delay-based scheme does not require any new packets to be injected into the network during overload or underload. Thus, there is no additional load imposed by the congestion avoidance scheme itself.

3. No change in packet headers: The procedures of this invention does not require any changes in the packet headers; all networks and protocols can be used with their existing packet formats.

4. Distributed control: The procedure is distributed (control is imposed only at a node itself, not from a central controller) and works without any central observer equipment.

5. Dynamism: The network constantly changes; network configurations and traffic vary continuously, and nodes and links come up and down and the load placed on the network by users varies widely. The optimal operating point is therefore a continuously moving target. The procedure of this invention dynamically adjusts its operation to the current optimal point. The users (nodes) continuously monitor the network by changing the load slightly below and slightly above the optimal point and verify the current state by observing the feedback.

6. Minimum oscillation: The increase amount of one and the decrease factor of 0.875 were chosen to minimize the amplitude of oscillations in the window sizes.

7. Convergence: If the network configuration and workload remain stable, the procedure brings the network to a stable operating point.

8. Information entropy: This relates to the optimum use of feedback information; the object is to convey the maximum amount of information with the minimum amount of feedback. By using implicit feedback (the acknowledgement packet has to be sent anyway, and its delay is present without any addition to the network or information flow), the procedure allows several bits worth of information to be obtained without adding any physical bits.

9. Dimensionless parameters: A parameter that has dimensions (length, mass, time) is generally a function of network speed or configuration. A dimensionless parameter has wider applicability. The window update frequency, window increase amount, and window decrease factor are all dimensionless. Alternatives that require using parameters such as minimum delay or maximum gradient are not used because such parameters have dimensions and would be valid only for networks of certain bandwidths and extents.

10. Configuration independence: The node requires no prior knowledge of the network configuration, number of hops or bridges, presence or absence of satellite links, etc.

As described above, the procedure according to the invention centers around window-based flow-control mechanisms. A window-based procedure is not a requirement, however, since the congestion avoidance algorithms and concepts discussed above can be applied by adjusting any network tuning parameter which affects network loading, and the algorithms can be easily modified for other forms of flow control such as rate-based flow control, in which the sources must send at a rate lower than a maximum rate (in packets/second or bytes/second) specified by the destination. In a rate-based system, the nodes adjust rates based on the delay experienced. Also, in the procedure discussed herein, it is assumed that round-trip delay can be estimated, which is possible only if packets are acknowledged explicitly or implicitly (by acknowledgment bits or by response to a request in the packet sent). Not every packet needs to be acknowledged, however; it is sufficient to receive an acknowledgement for only some packets sent. Most networking architectures, use only one timer to measure the round-trip delay while a number of packets are outstanding, and this is sufficient.

The delay-based procedures for congestion avoidance as disclosed herein may be supplemented according to various alternatives and additions. For example, alternative decision functions may be used with regard to window size. Secondly, additional information may be added in the decision making. Or, thirdly, the concepts may be extended to probabilistic networks. Also, alternative optimality criteria may be employed. Each of these will be discussed briefly.

Alternative decision functions may be used instead of only NDG as the decision function. Other possibilities are (1) intercept, (2) intercept/gradient ratio, and (3) delay at minimum window. The intercept decision function relies on the observation that given delays at two different window values, one can fit a straight line of the form (D=aW+b) where, a is the gradient and b is the intercept of the line. Before the knee, the intercept is close to the delay D, while after the knee, the intercept is close to zero. The use of the intercept/gradient ratio decision function relies upon the observation that the ratio b/a is larger before the knee but very small after the knee. The delay at minimum window function is based upon the observation that before the knee, the delay is close to delay at W=1, while after the knee, it is several times the delay at W=1. In networks that can modeled as a closed queueing network of several M/M/1 servers, the delay at the knee is approximately twice the delay without any queueing. Thus, if the delay at W=1 is measured, the window can continue to be increased until the delay is twice this amount. It is clear that several other combinations of NDG, intercept, gradient, and minimum delay can also be used in defining the decision function.

Additional information may also be employed instead of merely the round-trip delay. In the procedure disclosed above, a pure black-box approach was followed, assuming no knowledge whatsoever about the path a packet takes in the network. Additional information is sometimes available, however, and can be useful as an addition to the decision procedure. Examples of such information are: (1) number of nodes, and (2) the minimum delay. The effect of each of these will be discussed.

If the number of nodes or users n sharing the path is known, it is possible to reach close to social optimum using local power. If each user uses only $1/(2n-1)$ of the window predicted by the selfish optimum, i.e., $$W_i \leftarrow \frac{1}{2n-1}\left(\frac{\alpha}{1+\alpha}\right)\left(\frac{D}{\frac{\partial D}{\partial W_i}}\right)$$

then, it can be shown that starting from any initial condition the windows will eventually converge to a fair and socially optimal value so that $$W_i - W_j = \frac{1}{n}\left(\frac{\alpha}{1+\alpha}\right)\left(\frac{D}{\frac{\partial D}{\partial W_i}}\right) \forall i,j$$

It is possible to statically select n or make it a network parameter set by the network manager. In this case, the performance is slightly suboptimum during periods when the actual number of users is below n, and the scheme may diverge during periods when the number of users exceeds n. The divergence can be controlled by setting a limit $W_{max}$.

If the minimum delay (delay through a path with no queueing anywhere) is known, the current load of other users on the network can be estimated from the current delay, and from this a social optimum condition can be approximated. The gradient of the delay-window curve, if nonzero, is proportional to the bottleneck service time, and the minimum delay is equal to the sum of all service times. These two allow us to compute the knee capacity of the path. The difference in delay at $W_i = 1$ and minimum delay is proportional to the load by other users placed on the network. At a given node, this user's share of the load can thus be computed to achieve social optimum. Many networking architectures assign cost to network links based on their speed, and use this cost assignment to select the optimal path. In networks with very fast links, the service times at the switching nodes determine the optimality of a path and not the link speed. Thus, if cost were assigned to all servers (links as well as switches) based on their packet service time, the cost of a path would be a measure of the minimum delay.

The procedure of the invention is described above with reference to an example of a deterministic network, but the procedure is extendable to probabilistic networks in which the service time per packet at each server is a random variable. If the service times of the servers are random variables with a probability distribution, the round-trip delay becomes random too. A decision based on the delay then has a certain probability of being wrong. There are several alternatives to resolve this situation: (1) signal filtering, (2) decision filtering, (3) sequential testing, and (4) goal change. Each one of these will be discussed.

Signal filtering is one alternative. An extension of the delay-based procedure to the situation of random service times is to take several samples of delay at a given window, and estimate the mean and confidence interval of NDG. It must be realized, however, in regard to straight filtering, that delay is not a random variable, it is a random process. A random variable is characterized by a probability distribution function with parameters that do not change with time. A random process is characterized by a probability distribution function whose parameters change with time. These changes are caused by changes in network configuration or load. Unless a stochastic process is stationary, the time average (average of samples taken at different times) is not identical to space average (average of several samples taken at the same time). In any case, all averaging should be such that the recent samples have more impact on the decision making than the old samples. An exponentially-weighted averaging is therefore preferable to a straightforward summation of all samples taken for the same window.

Decision filtering is another alternative. This approach to handling randomness is to make several (say, $2k+1$) decisions, each based on a single sample. All decisions will not be identical. Some will ask the user to increase while the others will ask it to decrease the window. The final action taken will be as dictated by the majority. The probability of errors can be minimized by increasing k. Let p be the probability of correct decision based on one sample. Then, probability of correct decision based on $2k+1$ samples would be:

$$\sum_{i=k+1}^{2k+1} \binom{2k+1}{i} p^i (1-p)^{2k+1-i}$$

Similarly, the probability of incorrect decision is:

$$\sum_{i=0}^{k} \binom{2k+1}{i} p^i (1-p)^{2k+1-i}$$

Again, the decisions may be *aged-out* and recent decisions may be given a higher weight than earlier ones.

The third alternative is sequential testing. In the deterministic version of the delay-based procedure disclosed above, a check is made to see if NDG is zero. In the probabilistic version, this is changed to a statistical hypothesis test with a specified confidence level. A sequential testing procedure is proposed such that after k samples, the test request is to increase, decrease, or to take one more sample.

The fourth alternative is a goal change. For deterministic cases, NDG of the delay-window curve is zero to the left of the knee. This is not always true for probabilistic cases. For example, for a balanced network of h identical M/M/1 servers in a cycle, the average round-trip delay with $$\sum_{i=1}^{n} W_i$$

packets circulating in the cycle is:

$$D = \left( h + \sum_{i=1}^{n} W_i \right) t_b$$

where $t_b$ is the service time of each server. For this case, the delay curve is a single straight line, and there is no visible knee on the curve. Mathematically though, the knee can be determined as follows. The system power is:

$$P = \frac{T^a}{D} = \frac{\left( \sum_{i=1}^{n} W_i \right)^a}{D^{1+a}}$$

$$= \frac{\left( \sum_{i=1}^{n} W_i \right)^a}{\left( \left( h + \sum_{i=1}^{n} W_i \right) t_b \right)^{1+a}}$$

It is maximum at:

$$\sum_{i=1}^{n} W_i = h$$

The following holds at the optimal point: $D = 2ht_b = 2D_0$ where $D_0$ is the average minimum delay on the network with no queueing anywhere. Thus, the ratio of the delay to minimum delay rather than NDG is a better indicator of the knee for such a case. The exponential distribution of service time assumed in the above analysis is only for analytical convenience. In most practical networks, the service times have a variance much smaller than that implied by the exponential distribution. In the past, one reason for variability of service time used to be the byte-by-byte handling of packets such that the service time was proportional to the packet length. The current trend in network design is to get away from such handling, and the packet service times are getting closer to the constant distribution and away from the exponential.

There are alternative criteria which can be used to define optimality. For example, the new power function proposed by J. M. Selga in Proc. IEEE Infocom '84, pp. 87-94 achieves its maximum when the delay is a multiple (say, twice) the minimum delay. This requires knowing minimum delay of the path, but if the minimum delay is known then it is possible to extend the delay-based approach as discussed earlier.

Reiterating, round-trip delays through the network are an implicit indicator of load on the network, and using these delays provides a procedure for congestion avoidance in heterogeneous communications networks. Even in homogeneous networks, this procedure solves the problem of congestion feedback at resources, such as bridges, which do not operate at the architectural layer at which explicit congestion feedback can be provided. Also, this procedure has the desired property of putting zero overhead on the network itself. Described above is a sample procedure in which the sources use round-trip delay as the only feedback available to control their load on the network. As initially described, the procedure is in terms of deterministic networks, i.e., networks in which packet service time per packet is constant. In this context, simulation with many different deterministic configurations and scenarios shows the procedure to be convergent, fair, optimum, and adaptive to network configuration changes. A key issue in the procedure is selfish optimum versus social optimum. Alternatives that achieve selfish optimum and cause a race condition leading to divergence are avoided. Implementation of the procedure in networks where the service times are random and where users are competing rather than cooperating, presents addition considerations, but the concept still holds. In embodiments involving probabilistic networks, the use of game theoretic concepts or use of additional information about the network, provides alternative procedures within the scope of this invention.

Figure 11:
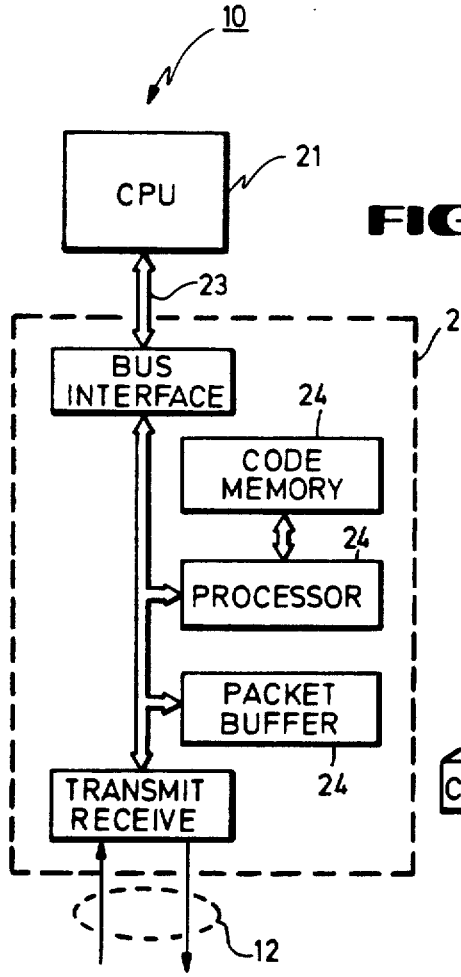
FIG. 11 is an electrical diagram in block form of one of the adapters 11 used in the computer interconnect system of FIG. 1.

Referring to FIG. 11, each one of the nodes 10a-10n, or the other nodes 15a-15n or 20a-20n, in one embodiment, may consist of a CPU 21 or processor device coupled to a communications adapter 22 by a system bus 23. The bus 23 can include the same address/data bus and control bus which the CPU uses for accessing main memory and other such local resources. The adapter 22 usually handles the network protocol, and buffers incoming and outgoing packets. Although the construction of the adapter varies depending upon the type of equipment being employed, ordinarily the adapter includes a local processor 24 executing code from a local memory 24a to define the transmit/receive protocol and to manipulate incoming and outgoing packets in a packet buffer memory 24b. The delay time measurements discussed above are made by using a timer algorithm executed by the CPU 21 or by the local processor 24, depending upon the particular system employed; the time of sending the first packet of a window is noted, then the time of receipt of the first acknowledgement is noted, so the difference is the delay time.

The control is discussed above as being based upon changing the window sizes, which is done by changing the number of packets sent in one burst by a node. The same concepts of congestion avoidance are applicable to a rate based method, where the rate of sending packets (in packets per second) is varied instead of packets per window. Instead of decreasing multiplicatively and increasing additively (for an integral number of packets) as done for window-based, the rate-based method increases and decreases multiplicatively and may be for a fractional number.

Figure 12:
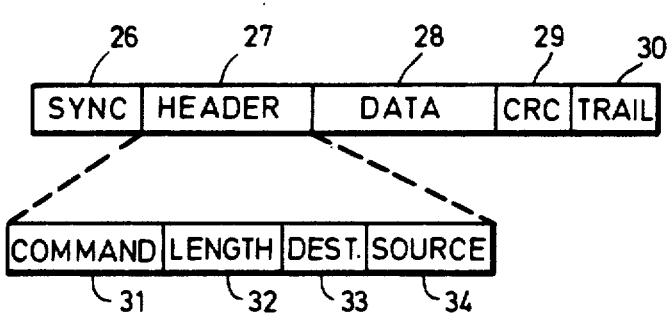
FIG. 12 is a diagram of one embodiment of a packet format which may be used in the computer interconnect system of FIG. 1.

One type of typical format of the message packets 25 transmitted and received on the links 12, 16 or 19 in the system of FIG. 11 is set forth in FIG. 12. The exact format of the packet 25 depends upon the protocol used for the link, and would ordinarily include a sync portion 26, a header 27, an information field 28, a CRC field 29 and a trailer 30. Usually the sync portion and trailer are added by the communications adapter 11, while the header 27, information field 28 and CRC is generated in the host computer or CPU 21 for a node. The field 28 comprises an integral number of bytes which is variable in length from a few up to, in an example embodiment, 512. Each byte of the packet 25 is commonly transmitted bit-serially on the lines 12, 13, etc., often using Manchester coding or a similar code. The transmission rate on a serial link is, for example, about one to four Mbit/sec for low-end Ethernet or token ring systems using twisted pair cabling, up to 70-Mbit/sec or more for computer interconnect systems of the DEC-Net type using fibre optic coupling. The sync portion 26 includes a number of sync characters, and functions to allow the receiving adapter 22 to recognize the beginning of an incoming message and to regenerate a clock synched on the bit and character boundaries. The trailer 30 includes first a CRC generated by the source node and used by the receiver node to calculate a function of all of the bits in the header 27 and information field 28 to check the integrity of the received data; the trailer 30 also ends with a number of trailer characters which merely function to designate the end of a message packet.

The packet 25 of FIG. 12 is defined according to a protocol specified for the particular type of communications network used. In a typical embodiment, the header 27 of the packet 25 includes a type or command field 31 specifying what type of message is being transmitted, followed by a length field 32 specifying the length of the message expressed as the number of bytes. An address field 33 specifies the destination address to which the CPU 10 (of the source node) requests the data be sent. The source address (the address of the node sending the data) is contained in a field 34. The size of the address fields determines the number of nodes that can be uniquely addressed in a network. These fields 31 to 34 constitute the "header" of the packet. Following the addresses in the packet 25 is the data field 28, which may be from zero to 512 bytes in length. An acknowledgement packet is of the same format as the packet 25 of FIG. 12, but it usually has a zero-length data field 28; the type field 31 of an acknowledgement packet may have a certain code for a positive acknowledge and another code for a negative acknowledge or NAK.

The medium used to convey the data packets along the serial links as illustrated in FIG. 1 may be pairs of coaxial lines, for example. That is, two coaxial cables connect to each node, one for transmit, the other for receive. It is understood, however, that other media such as fibre optics or twisted-pair cabling, could be used instead. Also, it is understood that instead of employing separate receive and transmit cables, a single transmit/receive cable or bus may be used. Likewise, the network usually includes bridges to other networks, as mentioned.

Examples of types of packet data communication systems which may use the features of the invention are shown in U.S. Pat. Nos. 4,777,595, 4,560,985, 4,490,785, and in copending applications Ser. Nos. 109,503, 110,009 and 110,513, filed Oct. 16, 1987, all assigned to Digital Equipment Corporation, assignee of this invention. These computer interconnect systems are of the type employing packet data transfer using serial paths. These types of computer interconnect systems have been commercially used for processors and bulk memory facilities of the VAX architecture, and provide versatile systems of high performance and reliability. Other commercially-available communications networks include the so-called Ethernet system as disclosed in U.S. Pat. No. 4,063,220, issued to Metcalfe et al, and the token ring system such as the IEEE 802.5 standard and the FDDI (fibre distributed data interface) standard. Each of these communications systems, or local area network systems, employs serial data transmission, usually involving a carrier modulated with the serial data. Of course, the concepts herein disclosed are equally applicable to other types of data transfer systems, whether serial or parallel.

While this invention has been described with reference to a specific embodiment, this description is not meant to be construed in a limiting sense. Various modifications of the disclosed embodiment, as well as other embodiments of the invention, will be apparent to persons skilled in the art upon reference to this description. It is therefore contemplated that the appended claims will cover any such modifications or embodiments as fall within the true scope of the invention.

What is claimed is:

1. For use in a data communication network having a plurality of nodes, including a first node including a processor characterized by a changeable parameter which affects the level of loading imposed on the network by the transmission of data by said first node, the plurality of nodes also including a destination node, a method of congestion avoidance comprising the steps of:
   a) sending a first group of data from the first node to said destination node, loading of said network during travel of said first group of data from said first node to said destination node being at a first loading value which represents the loading imposed on the network when said first group is sent by the first node;
   b) receiving at the first node an acknowledgement that at least some of the data in the first group was received by the destination node;
   c) measuring by said processor of said first node a first time delay which is the time delay between the sending of the first group of data and the receiving of the corresponding acknowledgement;
   d) sending a second group of data from the first node to the destination node, loading of said network during travel of said second group of data from said first node to said destination node being at a second loading value which represents the loading imposed when the second group is sent by the first node;
   e) receiving at the first node an acknowledgement that at least some of the data in the second group was received by the destination node;
   f) measuring by said processor of said first node a second time delay which is the time delay between the sending of the second group and the receiving of the corresponding acknowledgement;
   g) computing by said processor of said first node a quantity which is a function of the ratio between (1) the relative difference between the first and second time delays, and (2) the relative difference between the first and second loading values; and
   h) automatically changing by said processor of said first node said changeable parameter so as to increase the loading from any data to be subsequently sent by the first node if the said quantity is less than a predetermined value, and changing at said first node said changeable parameter so as to decrease such loading if said quantity is greater than said predetermined value.

2. A method according to claim 1, wherein the step of changing includes changing a parameter consisting of the window size said window size being equal to the maximum number of data packets the first node may transmit at a time.

3. A method according to claim 2, wherein the first and second loading values are the respective window sizes used by the first node when sending data immediately prior to sending the first and second groups, respectively.

4. A method according to claim 1, wherein the step of changing includes changing a parameter consisting of the bit rate at which the first node may transmit data.

5. A method according to claim 4, wherein the first and second loading values are the respective bit rates at which the first node sent data immediately prior to sending the first and second groups, respectively.

6. A method according to claim 1, wherein the step of changing includes changing a parameter consisting of the maximum packet rate at which the first node may transmit data.

7. A method according to claim 6, wherein the first and second loading values are the respective packet rates at which the first node sent data immediately prior to sending the first and second groups, respectively.

8. A method of operating a computer network, said computer network including a source node and a destination node, wherein said source node includes a processor, comprising the steps of:
   a) sending first data from said source node to said destination node by said network at a first loading level and receiving at said source node a first acknowledgement from said destination node of said network, said first acknowledgement confirming receipt of at least part of said first data; and measuring by said processor a first delay between said sending said first data and said receiving said first acknowledgement;
   b) measuring by said processor in said source node a second delay between sending second data from said source node to said destination node and receiving at said source node a second acknowledgement from said destination node, said second acknowledgement confirming receipt of at least part said second data, said second data being sent by said source node with a second loading level different from said first loading level;

c) automatically changing the loading level by said processor of said source node, in response to a function of the difference in said measured first and second delays, said step of changing including decreasing from said second loading level if said second delay is greater than said first delay and increasing from said second loading level if said second delay is less than said first delay.

9. A method according to claim 8 wherein said step of changing the loading includes one of the steps of (a) changing the number of packets of data sent by said source and (b) changing the rate of packets sent by said source; said number of packets being termed the "window size".

10. A method according to claim 8 wherein said step of sending a first group of sata includes transmitting a number of packets of data.

11. A method according to claim 10 wherein said step of decreasing the loading includes decreasing the number of packets and said step of increasing the loading includes increasing the number of packets.

12. A method according to claim 11 wherein said step of changing the changeable parameter is also in response to the measured delays as a function of the relative change in the window sizes.

13. A method of controlling a source node in a data communications network, said source node including a processor, comprising the steps of:

a) sending first data from said source node of said network to a destination node in said network, using a selected data loading;

b) receiving at said source node first acknowledgement indicating receipt of at least part of said first data by said destination node;

c) measuring by said source node the delay time between said step of sending the first data and said step of receiving the first acknowledgement;

d) sending second data from said source node of said network to said destination node, using a different data loading from said selected data loading;

e) receiving at said source node a second acknowledgement indicating receipt of at least part of said second data by said destination node;

f) measuring said source node the delay time between said step of sending the second data and said step of receiving the second acknowledgement;

g) comparing by said processor at said source node said first and second measured delay times to produce a difference value;

h) and, at said source node, in response to a function of said difference value, changing the loading by increasing the data loading for further data sent by said source node to said destination node if said second delay time is less than said first delay time and by decreasing the data loading for further data sent by said source node to said destination node if said second delay time is greater than said first delay time.

14. A method according to claim 13 wherein said steps of sending first and second data includes sending data in a plurality of separate packets.

15. A method according to claim 14 wherein said step of decreasing said data loading is by reducing, by an integral number of packets, the size of window during which packets of data are sent, and wherein said step of increasing said data loading is by increasing, by an integral number of packets, the size of window during which packets of data are sent.

16. A method according to claim 13 wherein said data communications network includes a plurality of nodes and said steps are performed independently at each of said nodes.

17. A method according to claim 16 including the step of connecting said nodes to a router by serial links.

18. A method according to claim 13 wherein said steps of increasing and decreasing said data loading include varying said data loading above and below an operating point for said network to provide maximum throughput at minimum delay time.

19. A method of operating a packet data communications network having a plurality of nodes said nodes including a source node and a destination node, said source node including a processor, comprising the steps of:

a) sending first data from said source node of said network to said destination node of said network, using a selected first level of loading for said first data, said first data including a number of packets;

b) receiving at said source node a first acknowledgement of receipt of at least part of said first data by said destination node;

c) measuring and recording by said processor at said source node a first delay time between said step of sending said first data and said step of receiving said first acknowledgement;

d) sending second data from said source node of said network to said destination node, using a second level of loading for said step of sending second data different from said selected first level of loading, said second data including a number of packets;

e) receiving at said source node a second acknowledgement of receipt of at least part of said second data by said destination node;

f) measuring by said processor at said source node a second delay time between said step of sending said second data and said step of receiving said second acknowledgement, and comparing said recorded first delay time with the second delay time, to determine a change in delay time; and g) subsequently sending from said source node to said destination node third data at a loading greater than said second level if said change is a negative value and at a loading less than said second level if said change is a positive value, to approach an operating point of maximum throughput at minimum delay time.

20. A method according to claim 19 wherein said steps of sending said first data, said second data, and said further data each includes sending data in a plurality of separate packets.

21. A method according to claim 20 wherein said step of sending said third data includes changing, by an integral number of packets, the size of window during which packets of data are sent.

22. Apparatus for operating a computer network, wherein said network includes a source node and a destination node, comprising: means including a processor at said source node for measuring a first delay between sending first data from said source node to said destination node in said network at a first loading value and receiving at said source node a first acknowledgement from said destination node in said network indicating receipt of at least part of said first data, and means including said processor at said source node for subsequently measuring a second delay between sending second data from said source node to said destination node in said network at a second loading value different from said first loading value and receiving at said source node a second acknowledgement from said destination node in said network indicating receipt of at least part of said second data; and means including said processor at said source node for thereafter changing the loading by said source for subsequent data sent by said source node to said destination node by varying the loading from said second loading value toward another loading value in response to the difference between said measured first and second delays, the loading being decreased if said difference is positive and increased if said difference is negative.

23. Apparatus according to claim 22 wherein said source node includes means for sending said first data as a number of packets of data, and said means for changing the loading changes said number of packets of data sent by said source node.

24. Apparatus for controlling a first node in a data communications network, comprising: transmitter/receiver means including a processor in said first node and having sending means for sending first data from said first node to a destination node using a selected window size and then subsequently sending second data from said first node to said destination node using a second window size different from said selected window size, said transmitter/receiver means having receiving means for receiving at said first node acknowledgements from said destination node indicating receipt of at least parts of said first and second data after first and second delay times, respectively; control means including said processor in said first node including means for comparing said first delay time between said sending and receiving for said first data with said second delay time between said sending and receiving for said second data; and said transmitter/receiver means including means for subsequent sending of third data using an altered window size in response to said means for comparing, said means for subsequent sending using an altered window size larger than said second window size if said second delay time is less than said first delay time and less than said second window size if said second delay time is greater than said first delay time.

25. Apparatus according to claim 24 wherein said transmitter/receiver means transmits a number of packets of data from said first node of the network through at least one router to said destination node of the network.

26. Apparatus according to claim 24 wherein said sending means sends said first and second data by data packets, and wherein said window sizes each consists of an integral number of data packets.

27. Apparatus according to claim 26 wherein said means for subsequent sending causes said window size to increase when said comparing of the delays shows there is no difference in the delays.

* * * * *

UNITED STATES PATENT AND TRADEMARK OFFICE
CERTIFICATE OF CORRECTION

PATENT NO. : 5,193,151
DATED : March 9, 1993
INVENTOR(S) : Rajendra K. Jain

It is certified that error appears in the above-indentified patent and that said Letters Patent is hereby corrected as shown below:

Column 4, line 31, after "network" insert --power--.

Column 8, line 66, change "need" to --needs--.

Column 14, line 26, change "larger" to --large--.

Column 21, line 20, change "sata" to --data--.

Signed and Sealed this

Eleventh Day of January, 1994

Attest:

BRUCE LEHMAN

*Attesting Officer*  *Commissioner of Patents and Trademarks*